May 7, 1940.　　　T. G. TÖRNEBOHM　　　2,199,379
ROTARY CUTTING TOOL
Filed June 18, 1938　　　2 Sheets-Sheet 2

INVENTOR.
Torsten Gunnar Törnebohm
BY
HIS ATTORNEY.

Patented May 7, 1940

2,199,379

UNITED STATES PATENT OFFICE 2,199,379

ROTARY CUTTING TOOL

Torsten Gunnar Törnebohm, Katrineholm, Sweden, assignor to Aktiebolaget Svenska Kullagerfabriken, Goteborg, Sweden, a corporation of Sweden Application June 18, 1938, Serial No. 214,425
In Sweden July 1, 1937

3 Claims. (Cl. 29—103)

My invention relates to improvements in rotary cutting tools and has for one of its objects to provide a more efficient construction than has heretofore been available.

The present invention relates to improvements in rotating cutting tools with a plurality of cutting edges, particularly for milling or grinding machines, or the like, specially intended for working on plane surfaces. One object of the invention is to provide a cutting tool, the capacity of which, due to increased degree of efficiency, will be greater than with cutting tools of types hitherto known. Another object of the invention is to attain a standardization of the cutting tools for working on plane surfaces of various widths. A still further object is to provide a separate tool of this kind which can be applied to existing machines such as milling machines or the like, and which in itself includes the necessary members for causing the cutting edges of the tool to describe fundamentally epicyclic paths.

The tool comprises a number of cutting tool members rotatably mounted in a head and is characterized thereby that the head is connected to a mandrel or the like which is adapted to be connected to and driven from the work spindle of a machine tool such as a milling machine or the like and that the cutting tool members are operatively connected to a stationary member in such a manner that they are caused to rotate about their own axes upon rotation of the tool, whereby the tool head and cutting tool members together form a separate tool adapted to be driven from a machine tool spindle.

Figure 1:
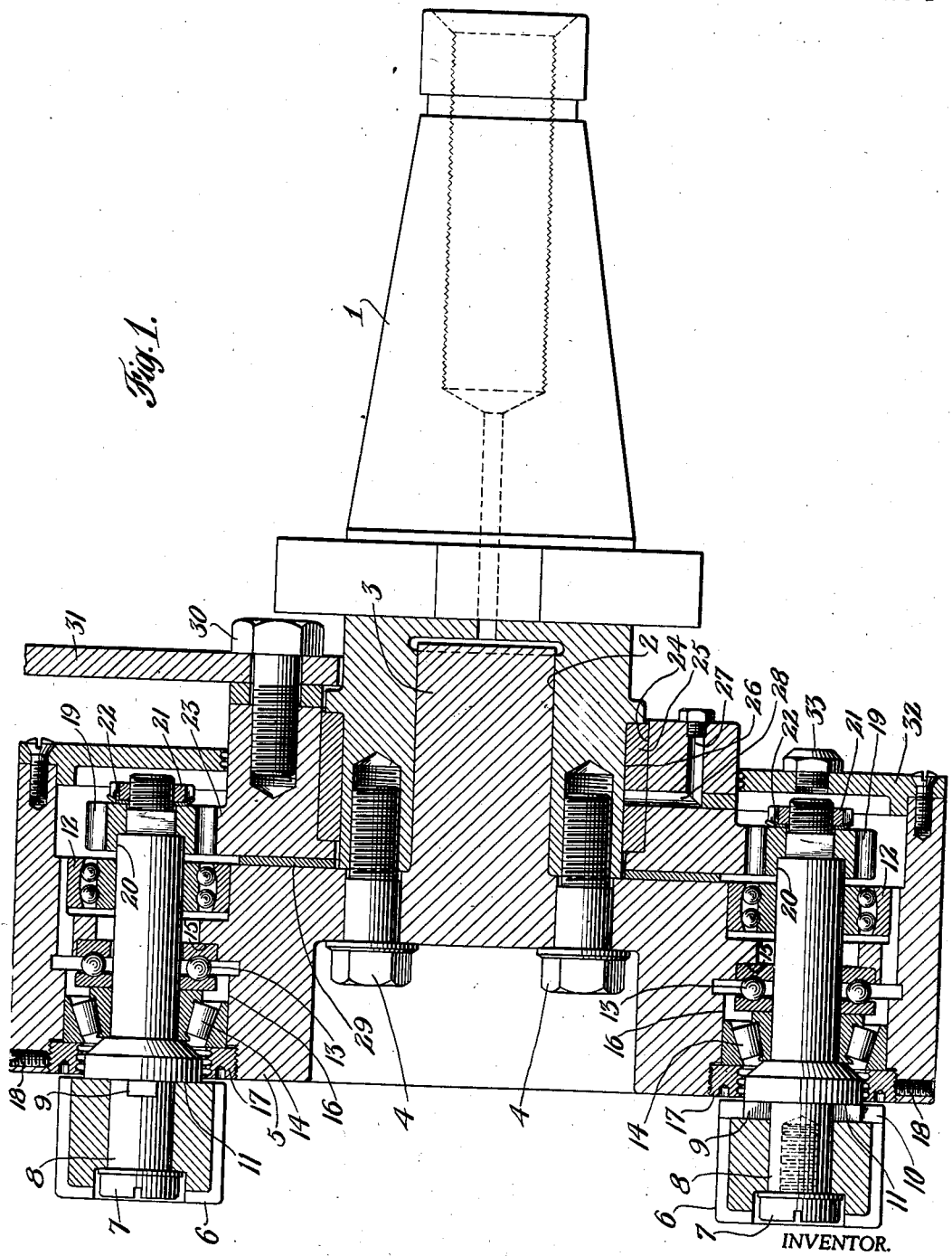
Figure 2:
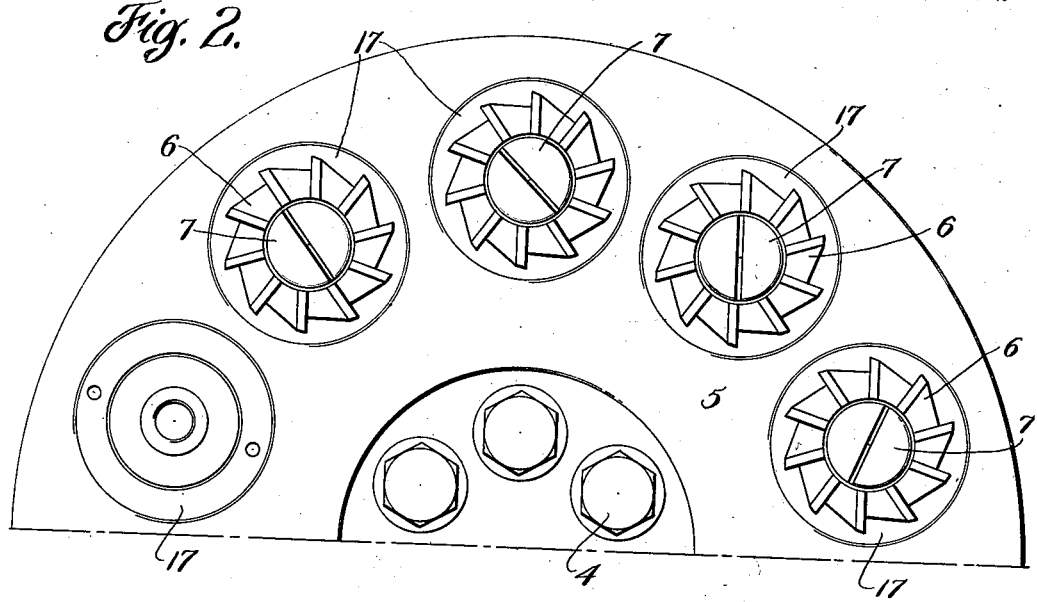
Figure 3:
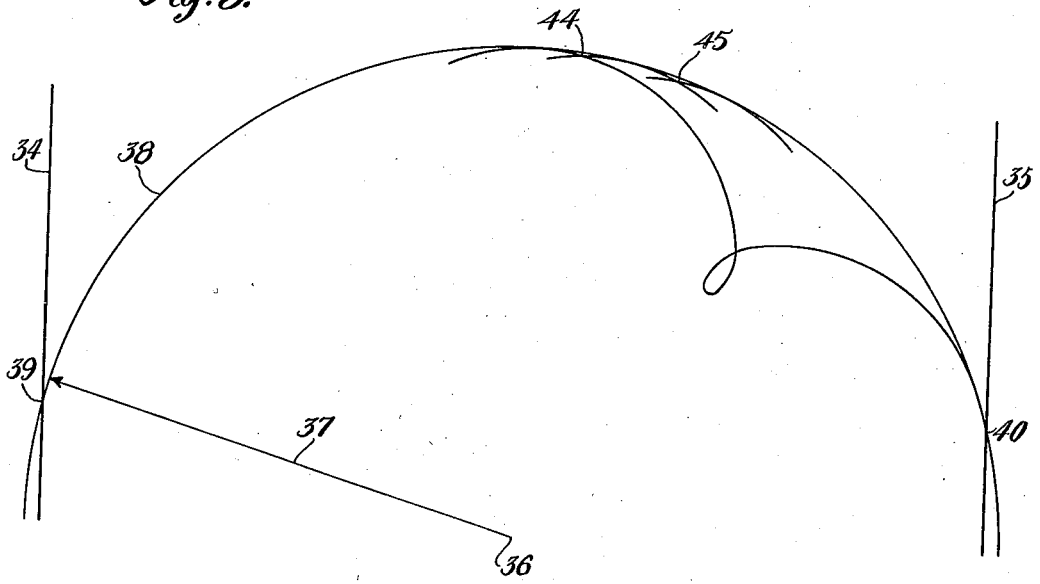

One embodiment of the invention, applied to a milling machine, is illustrated in the accompanying drawings, in which Figure 1 is a longitudinal section of the device.
Figure 2 is an end view, and
Figure 3 shows the paths of the cutter teeth in an ordinary machine respectively in a machine according to the invention.

In the drawings 1 shows a mandrel of conical form adapted to fit the work spindle of a milling machine or the like. On a cutter head 5, centered in relation to the mandrel by means of a tap 3 fitting into a hole 2 and fastened by screws 4, are mounted a number of milling cutters 6. The cutter head shown is provided with ten cutting tools of this kind. The cutters 6 are fastened to spindles 8 by means of screws 7, and the spindles are rotatably mounted in the cutter head. In order to prevent relative rotation between the cutters 6 and the spindles 8 the latter are provided with cross tongues 9 engaging corresponding slots 10 made in the inner end surfaces of the cutters. The screws 7 maintain the cutters pressed against the plane surfaces 11 of the spindles 8. These plane surfaces may preferably be adjusted in a plane after the spindles have been mounted in the cutter head. The cutters can then all be manufactured of equal height and their end surfaces will consequently all be in the same plane when mounted.

The spindles 8 are mounted in the cutter head 5 by means of a combination of ball and roller bearings for each cutter. This combination consists of a self aligning ball bearing 12, a thrust ball bearing 13 and a taper roller bearing 14. The ball bearing 12 is mounted at the rear end of the spindle 8 and has a sliding fit in the cutter head 5, and its only object is to take up the radial load at the rear end of the spindle. The thrust bearing 13 abuts against a shoulder 15 in the cutter head and takes the thrust load imposed on the spindle during the cutting operation, which load is transmitted from the cutter 6 through the spindle 8 and the inner ring of the taper roller bearing 14 to the thrust bearing 13. The outer ring of the taper roller bearing 14 has a sliding fit in a bore 16 in the cutter head and can be adjusted axially by means of an externally threaded ring 17 engaging the cutter head. This ring can be locked in desired position by means of a set screw 18. It is apparent from Fig. 1 that by tightening the threaded ring 17, the outer ring of the taper roller bearing 14 is moved to the right, whereby play in the taper roller bearing as well as in the thrust bearing 13 is simultaneously eliminated. In this manner both radial and axial play in the spindle mounting can be simultaneously taken up.

At their rear ends the spindles 8 have square seats for pinions 19 which are mounted on the spindles 8 and centered in relation to the latter by cylindrical recesses 20 fitting the cylindrical part of the spindles. The pinions 19 are retained in position by means of nuts 21 and lock washers 22. The teeth of the pinions 19 engage a central toothed wheel 23, which is provided with a concentrically located bore 24 for receiving a bushing 25, preferably made of phosphor bronze or other appropriate bearing metal, and which is pressed into the wheel 23 securely enough to prevent a relative rotation between these two parts. The inner surface of the bushing 25 is formed as a bearing surface to bear against a cylindrical surface 26 of the mandrel 1. The wheel 23 and the bushing 25 are provided with holes 27 and 28, through which lubricant can be introduced to the sliding surface 26. Between the wheel 23 and the cutter head 5 is a washer 29 of brass or the like, the surfaces of which form sliding surfaces to permit a relative rotating movement between the members 5 and 23. These sliding surfaces also obtain lubricant through the channels 27 and 28, as the lubricant introduced through these channels has to pass between these surfaces after having lubricated the sliding surface 26.

The rear end of the cutter head is closed by means of a cover 32, which is provided with a lubricant hole and a cap 33 for introducing lubricant to the pinions and the bearings.

By means of screws 30 the wheel 23 is fixed to a suitably formed holder 31 which is prevented from rotating by bearing against or being fixed to a stationary part of the machine. The holder 31 thus prevents the wheel 23 from rotating. When the mandrel 1 is driven by the machine, the cutter head 5 and the cutters 6 mounted thereon will consequently rotate around the axis of rotation of the mandrel 1. The wheel 23 being, as already mentioned, prevented from rotating, a sliding rotation of the cutter head against the sliding members 25 and 29 takes place. Through the rotation of the pinions 19 around the wheel 23, the spindles 8 and the cutters 6 mounted thereon are caused to rotate about their own axes. Each cutter 6 thus revolves around the axis of rotation of the mandrel 1 and rotates about its own axis. When working upon a plane surface the whole tool will be fed across the surface in a direction perpendicular to the axis of the mandrel. The feed is accomplished in the usual manner by the feed mechanism already provided for this purpose in milling machines.

Through the arrangement of the cutters described above every point of the cutting edges during operation will describe a path, the substantial characteristics of which are those of an epicyclic curve. Leaving out of consideration the component of movement resulting from the relative feed movement between the cutter and the work piece, the path of the cutting edges would consequently everywhere lie within a circle, the diameter of which is equal to the distance between the outmost cutting edges of two diametrically opposed cutters, with the exception of the points at which the curves are tangent to each other. In other words, the radius of curvature of the path described by the cutting edges will everywhere be less than the radius of the said circle, which radius is the radius for the circular path described by the cutting edges of a cutter of the ordinary type having a diameter equal to the effective diameter of a cutter according to the invention, i. e. equal to the distance between the outmost cutting edges of two opposed cutters 6.

This is illustrated in Fig. 3 of the drawings, in which it is assumed that the diameter of each cutter measured, over the cutting edges is greater than the pitch circle diameter of the pinions 19. Hence the loops in the paths of the cutting edges.

When milling a work piece, the width of which is indicated by the lines 34 and 35 in Fig. 3, by means of a cutter of usual construction rotating around the centre 36 and having a radius 37 from the said centre to the cutter edges, the cutting edges if the feed is left out of consideration for the time being, will cut along a circular arc 38 the whole distance between the points 39 and 40. A cutter of this type must consequently cut long, thin chips, and its efficiency will be less than that of a cutter cutting short thick chips.

In a cutter according to the invention, on the contrary, each edge will cut only along a short arc, for instance between the points 44 and 45, as shown in Fig. 3 which illustrates parts of the cutting paths of adjacent teeth. The length of this arc is determined by several factors, for instance by the gear ratio of the planet gear, the number of cutting edges for each cutter etc. but will under all circumstances be shorter than the arc 39—40. The feed may be increased in such a manner that the chips become short and thick, whereby increased efficiency and relatively small power consumption is obtained.

The capacity is also increased thereby that the number of tooth engagements per revolution of the cutter head will be much greater than in the case of an ordinary cutter. On the supposition that the wheel 23 is provided with 60 teeth and that each pinion 19 has 12 teeth, each cutter 6 makes five revolutions about its axis during the course of each revolution made around the centre of the axis of the cutter head. If furthermore each cutter 6 is provided with ten teeth and the number of cutters is ten, the number of tooth engagements per revolution of the cutter head will be 250, if it is assumed further than the removal of material takes place on one half of the cutter circumference. With a cutter of the ordinary type and of the size, corresponding to the cutter illustrated, the number of tooth engagements per revolution of the cutter will only be equal to the number of cutter teeth, i. e., between 20 and 30.

Each cutter tooth being in cutting engagement with the work piece during only a very short part of its path, the chip removal is facilitated. The space for the chips between the teeth can thus be made less which in its turn results in the possibility of either increasing the number of teeth per cutter or of augmenting the strength of the teeth.

The number of teeth per cutter can of course differ from that given in the case described above. Also the number of cutters to be mounted on the cutter head may vary, depending upon the desired effective diameter of the cutter. The system affords the possibility of producing standardized cutters, whereby the same cutters can be used in cutter heads having greater or smaller diameter.

In the above description the feed movement is assumed to be rectilinear. It is however apparent that the mandrel 1 can be mounted in a machine of such a type that the cutter head is moved in a circular path in addition to its own rotating movement. The paths of the edges will then be composed of three movements of rotation. Furthermore the work piece can be fed forward against the cutter head along either straight or curved paths.

Although only one form of the invention has been described yet it will be apparent that changes may be made within the scope of the claims without departing from the spirit of my invention.

Having thus described my invention, I claim and desire to secure by Letters Patent:

1. The combination with a rotatable tool head, of means for its attachment to a rotary spindle, the said head carrying a number of tools which are rotatable and revolvable on the same plane, and means carried by the head for rotating the tools as they revolve.

2. The combination with a rotatable tool head, of means for its attachment to a rotary spindle, the said head carrying a number of tools which have axes parallel with one another, which are parallel with the axis of head rotation and which are rotatable and revolvable on the same plane, and means carried by the head for rotating the tools as they revolve.

3. A tool head adapted to be connected for rotation with a spindle, said tool head having a number of cutting tool members mounted thereon to revolve about the axis of the tool head and to rotate about their respective individual axes, a pinion fixed to each rotating cutting tool, a stationary part having teeth in engagement with said pinions for rotating the cutting tool members about their own axes when the tool head is rotated from the spindle.

TORSTEN GUNNAR TÖRNEBOHM.